United States Patent
Wilson et al.

[11] Patent Number: 6,101,979
[45] Date of Patent: Aug. 15, 2000

[54] ADJUSTABLE SAFETY PET HARNESS

[76] Inventors: Randall R. Wilson, 623 Marnice Rd., Rio Linda, Calif. 95673; Fred A. Cox, 6950 College Ave., Sutter, Calif. 95982

[21] Appl. No.: 09/301,308

[22] Filed: Apr. 29, 1999

[51] Int. Cl.⁷ .............................. A01K 15/04; A61D 3/00
[52] U.S. Cl. ........................................... 119/725; 119/771
[58] Field of Search ................... 119/725, 726, 119/907, 792, 856, 771, 864

[56] References Cited

U.S. PATENT DOCUMENTS

| | | | |
|---|---|---|---|
| 3,310,034 | 3/1967 | Dishart | 119/771 |
| 3,948,222 | 4/1976 | Longshore et al. . | |
| 4,324,204 | 4/1982 | Friedman . | |
| 4,512,286 | 4/1985 | Rux | 119/771 |
| 4,597,359 | 7/1986 | Moorman | 119/28.5 |
| 4,715,618 | 12/1987 | Harris . | |
| 5,329,885 | 7/1994 | Sporn . | |
| 5,443,037 | 8/1995 | Saleme . | |
| 5,511,515 | 4/1996 | Brown et al. . | |
| 5,529,018 | 6/1996 | Butts . | |
| 5,769,030 | 6/1998 | Acoff | 119/712 |
| 5,913,285 | 6/1999 | Pritchard | 119/771 |
| 5,915,335 | 6/1999 | Holt, Jr. | 119/771 |

Primary Examiner—Peter M. Poon
Assistant Examiner—Judith A. Nelson
Attorney, Agent, or Firm—Richard C. Litman

[57] ABSTRACT

An adjustable safety pet harness for dogs and cats while traveling in a vehicle and strapped to a vehicle's seat belt. The harness comprises six flexible straps, wherein three straps are affixed to a synthetic lambskin chest pad. Two of the three straps are crossed chest straps and the third strap becomes a lower body strap removably attachable to an upper body strap. The chest straps have buckles for adjustment in length to fit the pet. The chest straps are attached on top to the upper body strap and held parallel by a cross-strap. A median portion of the cross-strap supports a connector strap which has a metal D-ring on an end on the cross-strap and its opposite end fastened to the upper body strap to secure a flexible nylon webbing with a snap hook at its distal end for connection with the D-ring. The connector strap is looped around a safety belt for protection of the pet during a sudden stop or collision.

5 Claims, 3 Drawing Sheets

ADJUSTABLE SAFETY PET HARNESS

BACKGROUND OF THE INVENTION

1. Field of the Invention

The present invention relates to an adjustable safety pet harness for cats and dogs, which harness is hooked to the shoulder or waist seat belt of a vehicle.

2. Description of the Related Art

The related art of interest describes various pet harnesses, but none disclose the present invention. The related art will be discussed in the order of perceived relevance to the present invention.

U.S. Pat. No. 4,715,618 issued on Dec. 29, 1987, to Garry L. Harris describes a vehicle safety harness for pets comprising a fabric jacket covering the chest and forequarters of the pet and having an open top portion. There are two openings for receiving the front legs. Three sets of adjustable belts extend across the front and rear of the open top portion for securing the jacket on the pet. The middle belt set which originates at the location of the front belt set crisscrosses the pet's back to anchor below the seat by connecting to eye bolts on the floor. The front strap has a connector ring for releasably receiving a leash or tether. Each strap of the middle belt set has a releasable latch proximate the jacket in front and an adjustable buckle proximate the clasp. The pet harness is distinguishable for its jacket configuration requiring two openings for the front legs and the crisscrossing aspect of the middle set of belts over the back of the pet for restraining movement by anchoring to two floor fasteners. The pet is practically immobilized by this harness to the car seat and which harness is anchored to the vehicle's floor.

U.S. Pat. No. 4,324,204 issued on Apr. 13, 1982, to Michael E. Friedman describes an asymmetrical one-piece animal safety restraint for vehicles. The harness is strapped around the neck and body of a large dog by hook and loop fastening patches. Two D-rings on one side of the harness are hooked to a pair of slidable clamps along the length of a pair of vertical belts lashed around the rear seat back. The harness thus restrains the dog in a direction parallel to the car seat. The harness is distinguishable for its one-piece structure and a required parallel hookup arrangement of the pet to the car seat back.

U.S. Pat. No. 5,443,037 issued on Aug. 22, 1995, to M. Cecilia Saleme describes a canine seat belt and harness. This equipment was touted as an improvement over the previous two patents requiring jackets. The harness comprises two parallel web belts having three connecting webs, wherein the middle connecting web has a looped web strip for attachment of a D-ring. The two parallel web belts are connected by hook and loop fastening strips around the neck and chest of the canine. The harness is fastened by a tether to a D-ring movable along a single web belt vertically positioned in the center of a rear seat back. The canine seat belt and harness is distinguishable for its requirement for the vertical web belt and a choking susceptible harness element around a neck of the canine.

U.S. Pat. No. 4,597,359 issued on Jul. 1, 1986, to Maurice D. Moorman describes a vehicle safety platform having a harness for small pets. The small pet harness comprises a pair of non-choking chest straps connected to a pair of rib straps with a looped back strap holding a lead ring for a leash. The rib straps have a take-up buckle. The chest straps are combined underneath the pet to the rib straps and to a connector (fixture) having a take-up buckle for an adjustable lead line anchored to the platform. The harness is distinguishable for its lack of a chest pad and the structurally different chest strap connection to the rib straps.

U.S. Pat. No. 5,529,018 issued on Jun. 25, 1996, to Margaret M. Butts describes an animal seat belt harness having a back web and a neck opening. There are two parallel anterior straps with adjustable buckles and anchor loops separated by a snap fastener in the collar portion, two chest straps with releasable fasteners, and two bifurcating posterior straps. The long anterior and posterior straps are connected by their loops to a seat belt. The harness is distinguishable for the choking collar strap and at least four tie-ups to the seat belt of a vehicle.

U.S. Pat. No. 3,948,222 issued on Apr. 6, 1976, to Frederic Longshore et al. describes an animal safety harness apparently made of leather straps which are riveted at intersections. An encircling body strap has a belt buckle at its bottom portion and a leash ring on its top portion. An inverted U-shaped strap is positioned parallel to and in front of the body strap by a back strap. Another U-shaped strap extends forwardly around the chest area and is riveted to the other two straps. A first chain connects the forward chest straps between the other two straps by snaffle snaps. A second longer chain is connected to the first chain by an end snaffle hook and anchored at its opposite end to an eye bolt fastened to the floor of the vehicle. The harness is distinguishable for its omission of a chest pad and the excessively long chain hooked up to the floor.

U.S. Pat. No. 5,511,515 issued on Apr. 30, 1996, to Donald D. Brown et al. describes an animal training and restraining harness. The harness consists of a first vertical body encircling strap having a buckle under the animal's belly. A U-shaped horizontal strap is stitched to the sides of the body strap. Another vertical U-shaped strap connects to the horizontal strap and is connected parallel to the first body strap by a looped cross strap fitting along the back of the animal. Leg restraining loops are connected to an immobilizing strap through D-rings positioned in four locations on the first body strap with the ends joined to a retaining O-ring. The training harness is distinguishable for its leg restraining elements.

U.S. Pat. No. 5,329,885 issued on Jul. 19, 1994, to Joseph S. Sporn describes a leash-controllable dog harness made of nylon webbing and comprising two loops crossing across the chest and joined on top by a short strap and a steel rivet. The loops are angled approximately 45° apart and are buckled for adjustment. The harness is distinguishable for its lack of a chest pad and an elementary two loop structure.

None of the above inventions and patents, taken either singularly or in combination, is seen to describe the instant invention as claimed. Thus, a adjustable safety pet harness solving the aforementioned problems is desired.

SUMMARY OF THE INVENTION

The pet safety harness of the present invention is intended for strapping of the dog or cat inside a vehicle equipped with seat belts. The adjustable pet harness has a chest pad held by two crossing chest straps which engage a wide body strap. A fourth strap connects the crossing chest straps by traversing the back of the pet. These straps are made of durable flexible web material. A quick release snap hook and strap is looped around a seat belt and attached to a metal D ring on the harness. Although the harness is adjustable in size for cats and medium size dogs, larger sizes of the safety harness can be made for larger sized animals.

Accordingly, it is a principal object of the invention to provide a safety harness for cats and dogs travelling in a vehicle.

It is another object of the invention to provide a pet safety harness which has a chest pad and is adjustable in various dimensions to fit cats and medium size dogs.

It is a further object of the invention to provide a pet safety harness which has a strap for looping around a seat belt and attached to a metal D ring on the harness.

Still another object of the invention is to provide a pet safety harness which has a quick release chest strap buckle, which enables the harness to be put on the animal easily by slipping it over the head and connecting the chest straps.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
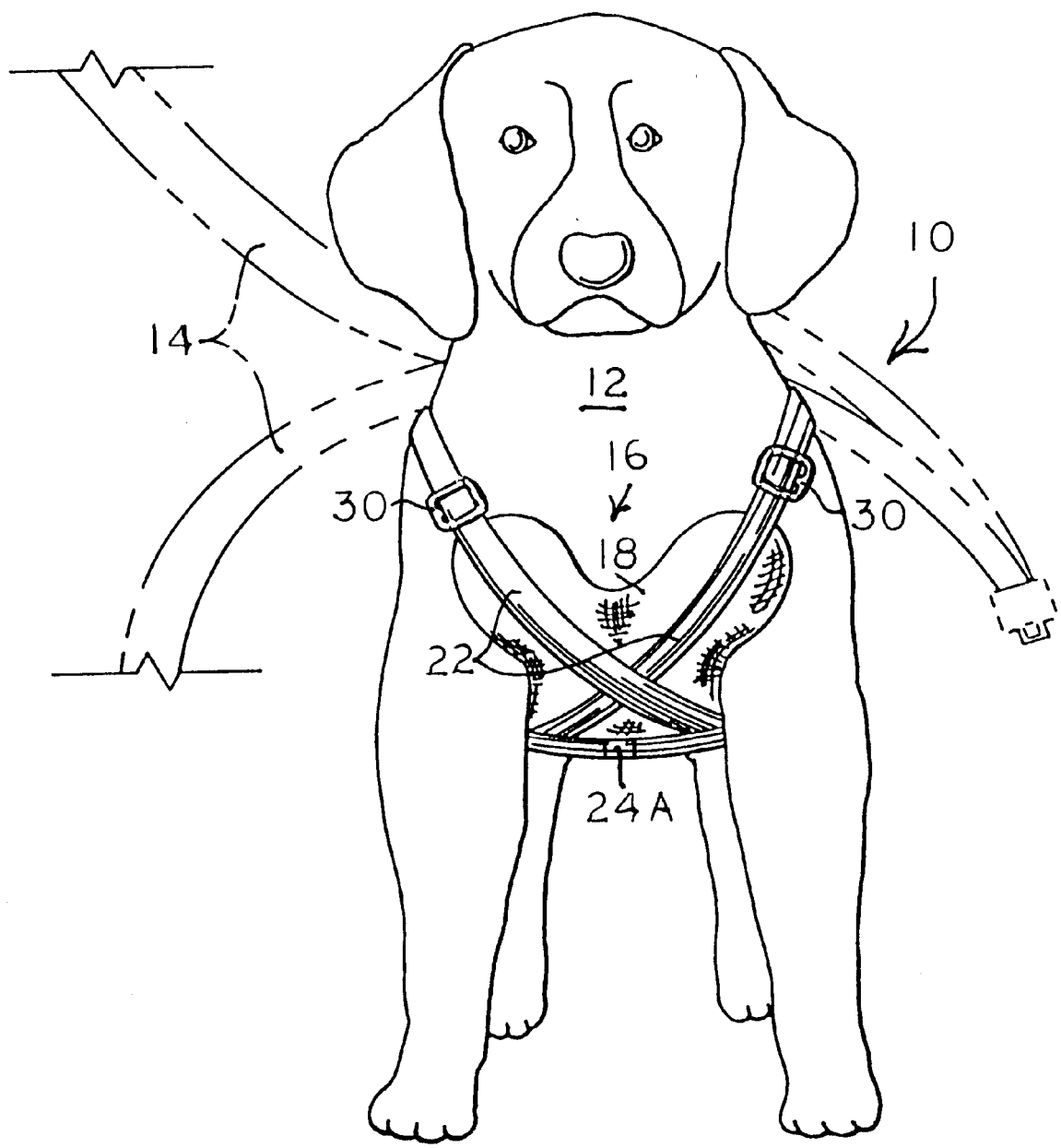
FIG. 1 is an environmental, front elevational view of a dog in an adjustable safety pet harness strapped to a seat belt according to the present invention.
Figure 2:
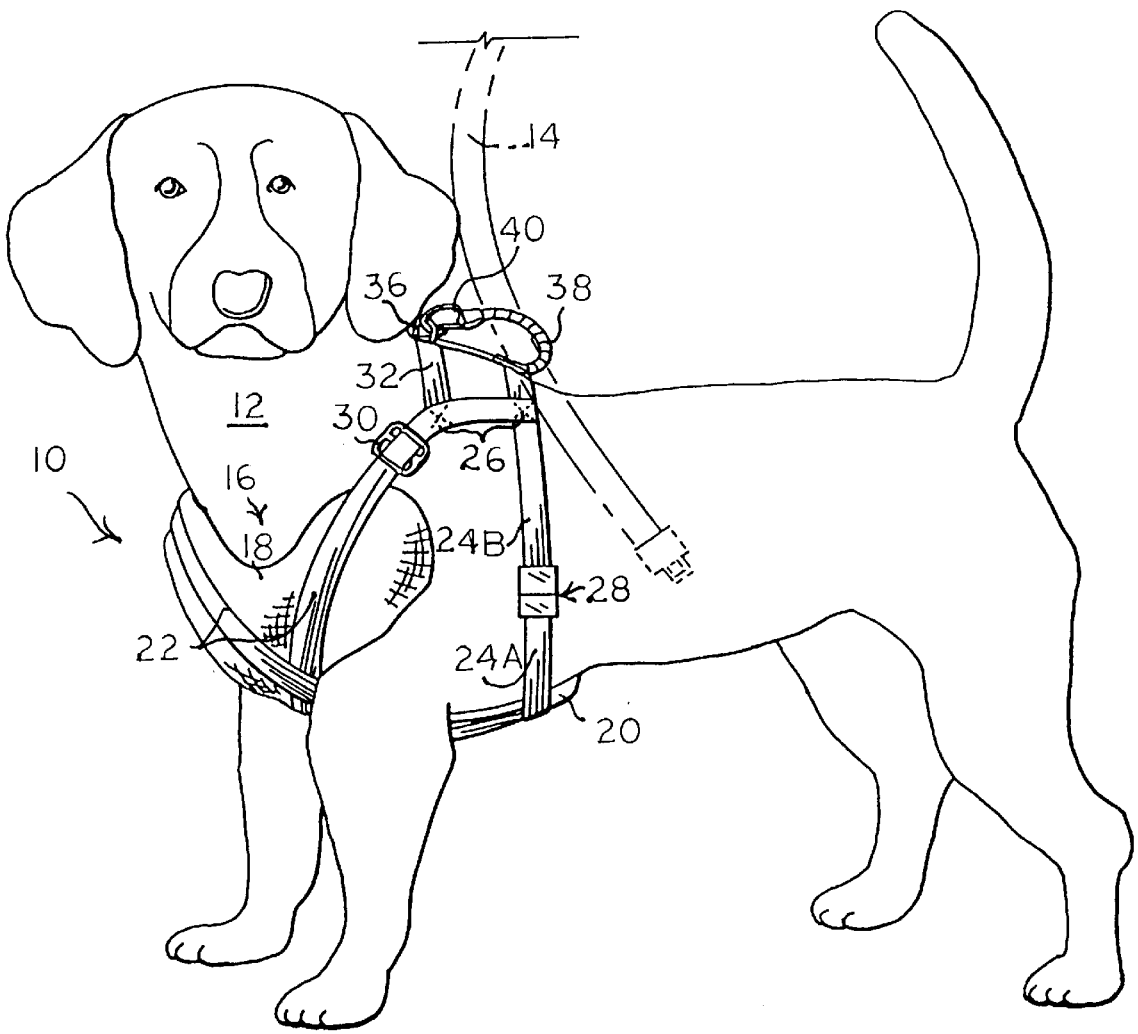
FIG. 2 is a side elevational view of a dog harnessed to a seat belt.
Figure 3:
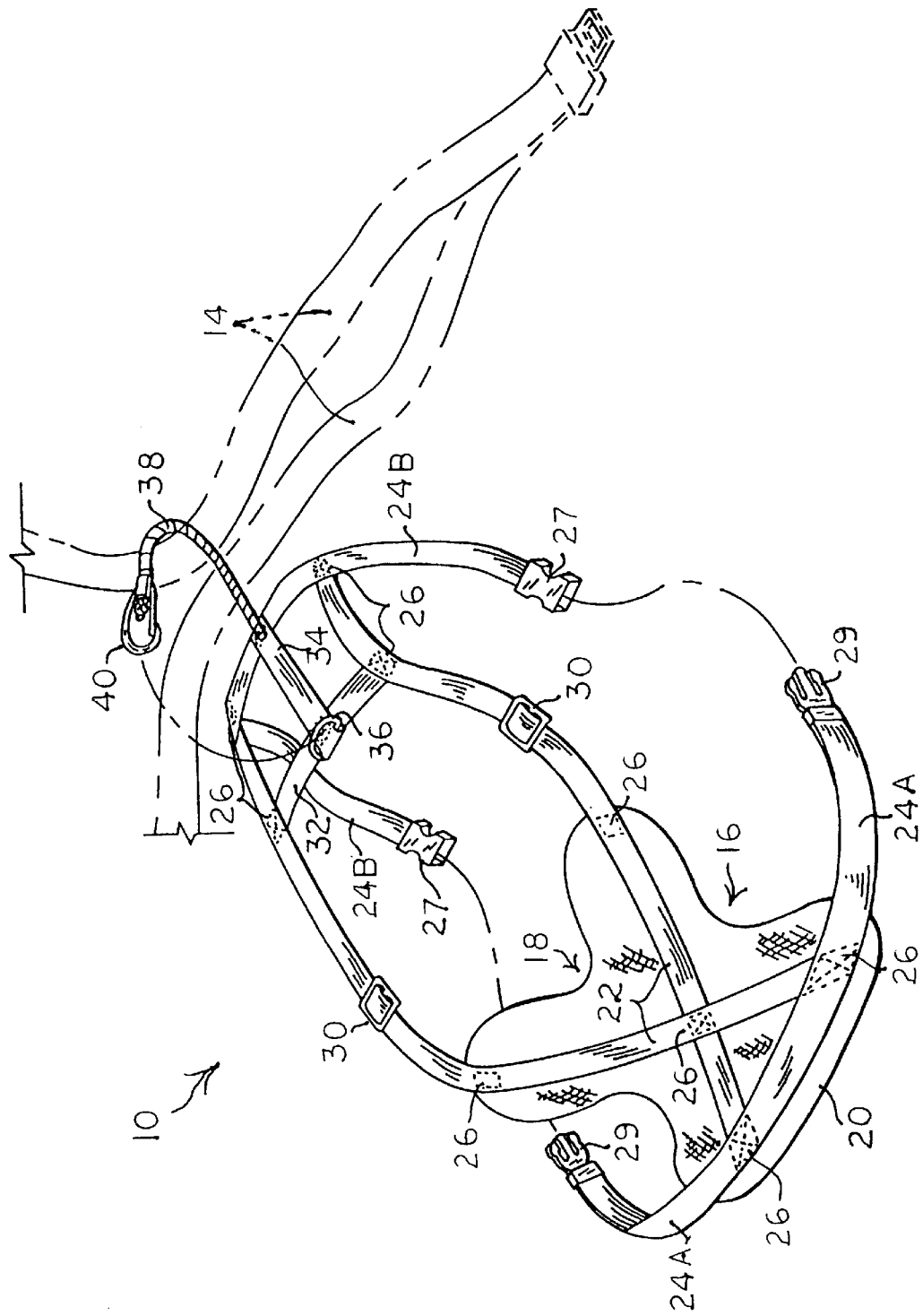
FIG. 3 is a perspective view of the safety harness.

The present invention is directed to an effective adjustable safety pet harness for dogs and cats while travelling in a vehicle. In FIGS. 1 and 2, a safety pet harness 10 is illustrated strapped around a medium size dog 12 and connected to a seat belt 14 (in shadow) of a vehicle. FIG. 3 depicts the harness 10 without the pet. A comfortable and durable chest pad 16 made from synthetic lambskin is provided. The chest pad 16 has a V-shaped top front portion 18 and a rounded rear bottom portion 20. The chest pad is held by two 1 in. wide webbing type crossing chest straps 22 and a first set of two wider 1.5 in. webbing type body strap 24A. These straps are stitched at various points 26 to each other and to the outside surface of the chest pad 16 to ensure a stable protection. However, the straps can be looped at certain locations for movement along the adjacent straps and adjustment of the safety harness to different sized pets in the same household.

The first set of the wider body straps 24A fitting the pet's belly are buckled to the second set of body straps 24B traversing the pet's back by snap buckles 28. The female latching elements 27 and the male latching elements 29 being made of plastic form the snap buckles 28. The two chest straps 22 continue from the chest pad 16 to join the body straps 24B. Each chest strap 22 has an adjustable buckle 30 for removing any slackness in the chest strap. The two chest straps 22 are also reinforced by a cross-strap 32 traversing the pet's back region which prevents the chest straps 22 from falling off the pet's shoulders.

A short connector strap 34 connects the cross-strap 32 to the second set of body straps 24B. One end of connector strap 34 on the cross-strap 32 has a metal D-ring 36 attached to webbing type material to provide some limited elasticity and give in a sudden stop of the vehicle. The opposite end of the connector strap 34 has flexible nylon webbing 38 with a metal snap hook 40 for looping around the vehicle's seat belt 14 and attaching to the D-ring 36 to provide a strong yet flexible anchor for the pet. The connector strap 38 facilitates a quick hookup of the safety harness 10 to the seat belt 14 without unnecessary difficulty hooking up the pet.

It should be noted that the connector strap 38 of the safety pet harness 10 can be looped around a shoulder belt as well as a seat belt 14. Furthermore, the connector strap 38 can encircle the belt for a less mobile connection. All the webbing type material forming the straps can be made of high strength nylon fibers.

Thus, a safety pet harness, adjustable in size, has been shown for protecting a pet within a vehicle with a minimum of difficulty in harnessing the pet and hooking up to a seat belt. It should be noted that no part of the safety harness affects the neck of the pet. It is also contemplated that the harness can be hooked up to other parts inside the car such as head restraints and the like solid supports.

It is to be understood that the present invention is not limited to the embodiment described above, but encompasses any and all embodiments within the scope of the following claims.

We claim:

1. An adjustable safety pet harness for attaching a pet to a seat belt in a vehicle comprising:

a chest pad made from synthetic lambskin and having a V-shaped top front portion and a rounded rear bottom portion;

a first set of integral lower body straps attached to the rounded rear bottom portion of the chest pad, wherein each strap end has a female latching element;

a second set of integral upper body straps for attachment by male latching elements to the female latching elements of the first set of integral lower body straps;

a pair of chest straps, each having a top end, an intermediate top chest portion and a bottom end, are attached to the chest pad by crossing at a midpoint of the chest pad, and wherein the crossing point, the bottom ends and the chest strap portion proximate the intermediate top chest portion are attached to the chest pad;

each free end of each chest strap is attached to a top portion of the first set of lower body straps;

a cross-strap having a median point and distal ends is attached by its distal ends to the chest straps to secure their parallel alignment;

a short connector strap is attached at one end to the cross-strap at its median point and appends a metal D-ring; and an opposite end of the short connector strap is attached to a median point of the second set of body straps and secures a length of nylon webbing having a snap hook at its distal end;

whereby, the first and second sets of body straps can be secured around the chest of a pet by the female and male latching elements, and the flexible nylon webbing can be looped around a safety belt in a vehicle for protecting the pet from injury during a collision.

2. The adjustable safety pet harness according to claim 1, including a buckle for each crossed chest strap located between the chest pad and the cross-strap for adjusting the length of the chest straps to fit the harness to the pet.

3. The adjustable safety pet harness according to claim 1, wherein the intersections of each strap are cross-stitched.

4. The adjustable safety pet harness according to claim 1, wherein a predominant portion of each intersection of straps is configured as a loop on one strap surrounding the other intersecting strap to provide further adjustment on different sized pets.

5. The adjustable safety pet harness according to claim 1, wherein the D-ring is made from welded metal type material.

* * * * *